(12) United States Patent
Shen (10) Patent No.: US 6,621,861 B1
(45) Date of Patent: Sep. 16, 2003

(54) SYSTEM TO OPTIMIZE SIGNAL DETECTION

(75) Inventor: Xiao Andy Shen, San Bruno, CA (US)

(73) Assignee: Ciena Corporation, Linthicum, MD (US)

(*) Notice: Subject to any disclaimer, the term of this patent is extended or adjusted under 35 U.S.C. 154(b) by 16 days.

(21) Appl. No.: 10/072,650

(22) Filed: Feb. 6, 2002

(51) Int. Cl.$^7$ ................................. H04Q 1/20
(52) U.S. Cl. .................. 375/226; 375/228; 375/340
(58) Field of Search ....................... 329/304; 375/224, 375/226, 228, 340

(56) References Cited

U.S. PATENT DOCUMENTS 5,729,355 A * 3/1998 Cho et al. ............... 358/412
5,809,063 A * 9/1998 Ashe et al. .............. 375/141

* cited by examiner

Primary Examiner—Timothy P. Callahan
Assistant Examiner—Cassandra Cox
(74) Attorney, Agent, or Firm—Shailendra Bhumralkar; Daniel Tagliaferri; Michael Cammarata (57) ABSTRACT

System to determine an optimal detection point associated with an incoming data stream. The data stream has an associated eye pattern that contains a data value for each of a plurality of threshold points defined by a plurality of amplitude rows and a plurality of phase columns. The system includes a method that includes the steps of determining an amplitude opening value for each of the phase columns, determining a phase opening value for each of the amplitude rows, determining a selected phase opening from the phase opening values and a selected amplitude opening from the amplitude opening values, and determining the optimal detection point from the selected phase opening and the selected amplitude opening.

24 Claims, 9 Drawing Sheets

SYSTEM TO OPTIMIZE SIGNAL DETECTION

FIELD OF THE INVENTION

The present invention relates generally to data receivers, and more particularly, to a system for use in a data receiver to optimize a detection point for a received data stream.

BACKGROUND OF THE INVENTION

Optical networks are becoming widely used for distributing both high and low speed data over varying distances. Typically, an optical network is comprised of a number of network elements (NE) that are connected to each other in a variety of configurations so as to form a unified communication network. The communication network may extend over a small area, such as a company wide network, or may cover large distances, such as in regional or nationwide networks. Typically, the NE's allow network clients to input data for transmission over the network and to receive data transmitted over the network from other locations. Thus, data may be added or dropped from the network at NE locations as the data flows from point to point throughout the network.

A network element may include one or more transceivers that convert optical signals from one wavelength to another, or from an optical to an electrical signal (or vice versa), so that for example, data received at a first wavelength and bit rate is sent out at different wavelength and bit rate. The transceiver may include both input and output tributaries that allow data to be received from and transmitted to network users that are local to the network element. For example, an input tributary allows a network user to input signals at an NE for transmission over the network, and an output tributary allows a network user to receive signals at an NE that have been received from the network.

With respect to the input tributary of a transceiver, a network client may provide data having an encoded clock signal for transmission over the network. For example, the data may be encoded using a non-return to zero (NRZ) encoding scheme, where a "0" is the absence of a pulse, and a "1" is the presence of a pulse. Furthermore, different network clients may input data having different data rates. As a result, one problem that exists is that network operators are required set up the input tributaries to receive each client's data.

A tributary's input receiver may include a clock and data recovery (CDR) circuit that recovers a clock signal to associate with the received data stream. The clock signal is used by downstream processing logic to detect the data in the data stream. For example, the data stream may be processed by error correction logic prior to transmission on the network. The error correction logic uses the clock signal to detect the data and to encode error correction information with the data that will be used by a destination processor to correct any data errors that occur during transmission over the data network.

Unfortunately, one or more problems may occur if the recovered clock signal is not precisely aligned to the optimal detection point of the data stream. For example, the clock signal edges may occur slightly earlier or later than the optimal point in each data bit, resulting in an increase in the bit error rate (BER) associated with the data stream. Furthermore, setting a basic amplitude threshold for the data, for instance 50%, may not provide the best detection result. The mis-alignment of clock and amplitude threshold values results in significant detection problems, especially when the input power level of the data stream is low, so that even small mis-alignments result in many detection errors. As the detection errors increase, even the effectiveness of error correction processing is limited.

Therefore, it would be desirable to have a way to fine tune the amplitude and phase detection points of a data stream to improve data detection, especially at low input power, and thereby reduce data errors and increase the effectiveness downstream processing.

SUMMARY OF THE INVENTION

The present invention includes a system to fine-tune the amplitude and phase detection points of an incoming data stream. For example, in a receiver system, an incoming data stream may be input to a clock recovery circuit that generates one or more clock signals from the received data stream. However, the generated clocks may not be properly aligned to the data to provide the best data detection. Furthermore, the selected amplitude threshold value may not be optimal, and so, additional errors may occur. Thus, the system included in the present invention operates to fine-tune the detection point, in both amplitude and phase, so that the data can be optimally detected.

One or more embodiments included in the present invention operate to fine-tune the detection threshold by processing an "eye pattern" associated with the data stream. The eye pattern is a representation of the data stream and includes both amplitude and phase characteristics of the data. For example, a horizontal axis represents the data's phase characteristics and the vertical axis represents the data's amplitude characteristics.

In one embodiment, the system processes an eye pattern associated with the data to determine an optimal phase opening value and an optimal amplitude opening value. The optimal phase and amplitude opening values represent the best phase and amplitude detection regions in the eye pattern. The two opening values are used to determine an optimal threshold point that represents the best threshold point with which to detect the data. In one embodiment of the invention, the optimal threshold point is determined at periodic intervals so that the threshold point can be adjusted if the data's eye pattern changes over time. In another embodiment, the optimal detection threshold is determined and then stored in a memory, so that it may be retrieved for use at a later time.

Embodiments included in the present invention may be used in a variety of applications, including both electrical and optical transmission systems. For example, the system may be used in a network transceiver so that a clock signal recovered from a data stream may be fined tuned to the optimal detection threshold. The resulting transceiver provides excellent data detection, even at low power levels, and improves the operation of downstream processing systems, for example, error correction logic.

In one embodiment of the invention, a system for determining an optimal detection point associated with a data stream is provided. The data stream has an associated eye pattern that contains a data value for each of a plurality of detection points defined by a plurality of amplitude rows and a plurality of phase columns. The system includes an amplitude processor operable to determine an amplitude opening value for each of the phase columns, wherein for each of the phase columns the amplitude opening value indicates a total number of the plurality of amplitude rows that contain a data value that is below a selected threshold value. The amplitude processor also operates to determine a selected phase column based on the amplitude opening values.

The system also includes a phase processor operable to determine a phase opening value for each of the amplitude rows, wherein for each of the amplitude rows the phase opening value indicates a total number of the plurality of phase columns that contain a data value that is below the selected threshold value. The phase processor also operates to determine a selected amplitude row based on the phase opening values.

The system also includes control logic coupled to the amplitude processor and the phase processor. The control logic is operable to determine the optimal detection point based on the selected phase column and the selected amplitude row.

In another embodiment of the invention, a method is provided for optimizing a detection point associated with a data stream. The data stream has an associated eye pattern that contains a data value for each of a plurality of threshold points defined by a plurality of amplitude rows and a plurality of phase columns. The method includes a step of determining an amplitude opening value for each of the phase columns, wherein for each of the phase columns the amplitude opening value indicates a total number of the amplitude rows that contain a data value that is below a selected threshold value.

The method also includes a step of determining a phase opening value for each of the amplitude rows, wherein for each of the amplitude rows the phase opening value indicates a total number of the plurality of phase columns that contain a data value that is below the selected threshold value.

The method also includes a step of determining a selected amplitude row from the phase opening values and a selected phase column from the amplitude opening values, and a step of determining the optimal detection point from the selected phase column and the selected amplitude row.

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION OF THE INVENTION

The present invention includes a system to fine-tune the detection threshold of an incoming data stream. For example, a clock signal associated with the data stream may not be properly aligned to the data to provide the best detection threshold. The system included in the present invention operates to fine-tune the detection point so that the data can be optimally detected. Thus, various embodiments of the system included in the present invention are discussed in detail in the following text.

Exemplary Embodiment

Figure 1:
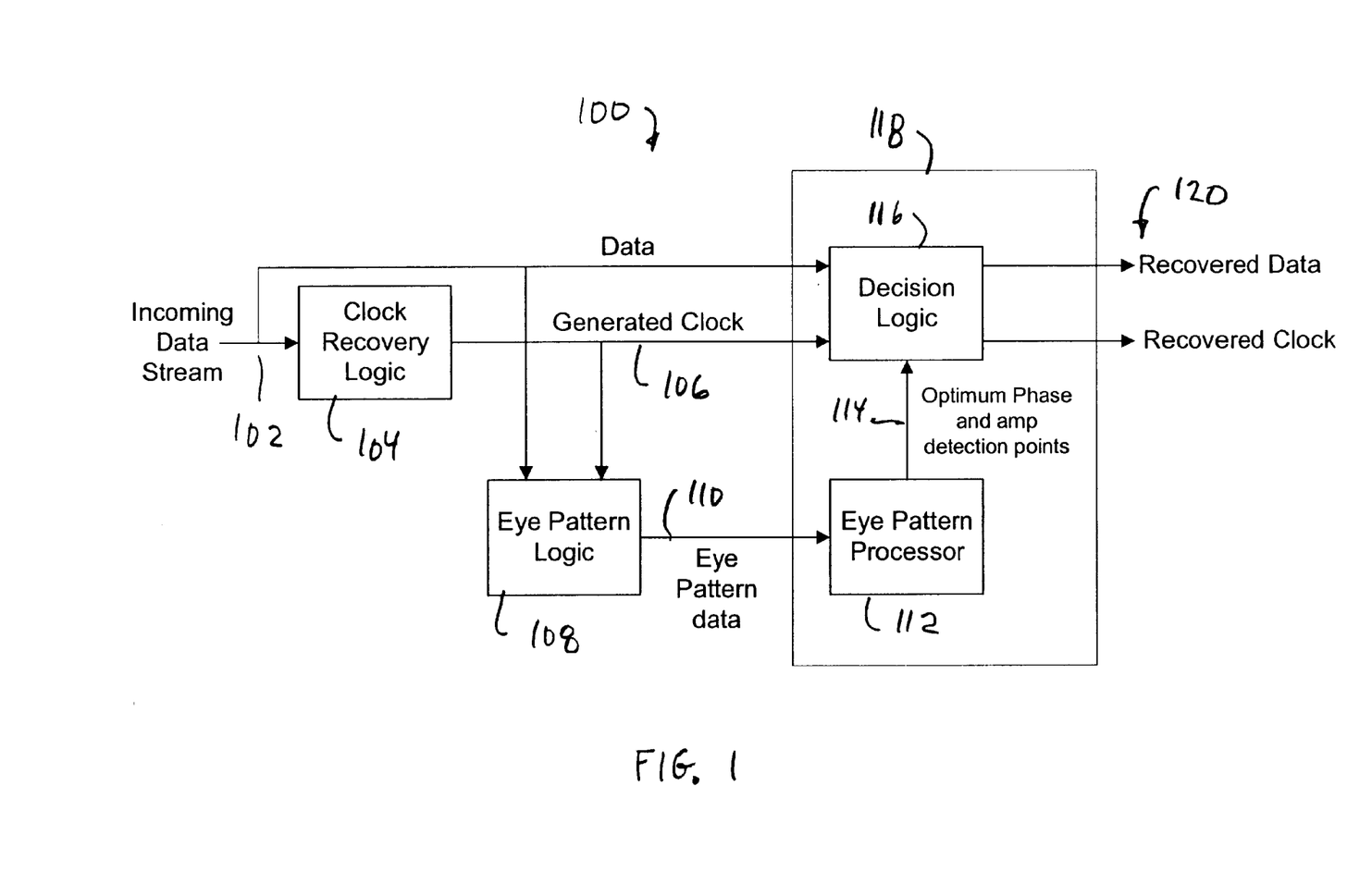
FIG. 1 shows an overview of a system for fine-tuning a detection point of a data stream in accordance with the present invention.

FIG. 1 shows an overview of a system 100 for fine-tuning a detection point of an incoming data stream in accordance with the present invention. The incoming data stream 102 is received by clock recovery logic 104 that recovers a clock signal 106 from the data. However, the clock signal may not be aligned to optimally detect the data, and the data may have some amplitude variations that also makes detection problematic. Both the clock and data are input into eye pattern logic 108 that generates eye pattern data 110 that indicates amplitude and phase characteristics for the data. For example, the data and clock are processed by suitable signal processing hardware and/or software that operate as part of the eye pattern logic 108.

Although the term eye pattern suggests a graphical representation of the data for presentation to a user, in actuality eye pattern logic 108 performs a signal processing function where the resulting data forms an eye pattern database. The database may be displayed to the user as an eye pattern, however, it may also be numerically processed by other processing systems to perform data detection functions in accordance with the invention. Therefore, although described with reference to display images of the data that may be easily understood and seen, one or more embodiments of the invention are best implemented as signal processing functions operating on eye pattern data stored in an eye pattern database.

The eye pattern data is input to an eye pattern processor 112 that is part of a grooming system 118 constructed in accordance with the present invention. The eye pattern processor operates on the data to determine the optimal phase and amplitude detection points 114 to detect the data. These optimal detection points are input to decision logic 116 where clock phase and amplitude detection adjustments are made so that the data and clock can be optimally recovered and output 120 for use by downstream processing logic.

Figures 2, 3:
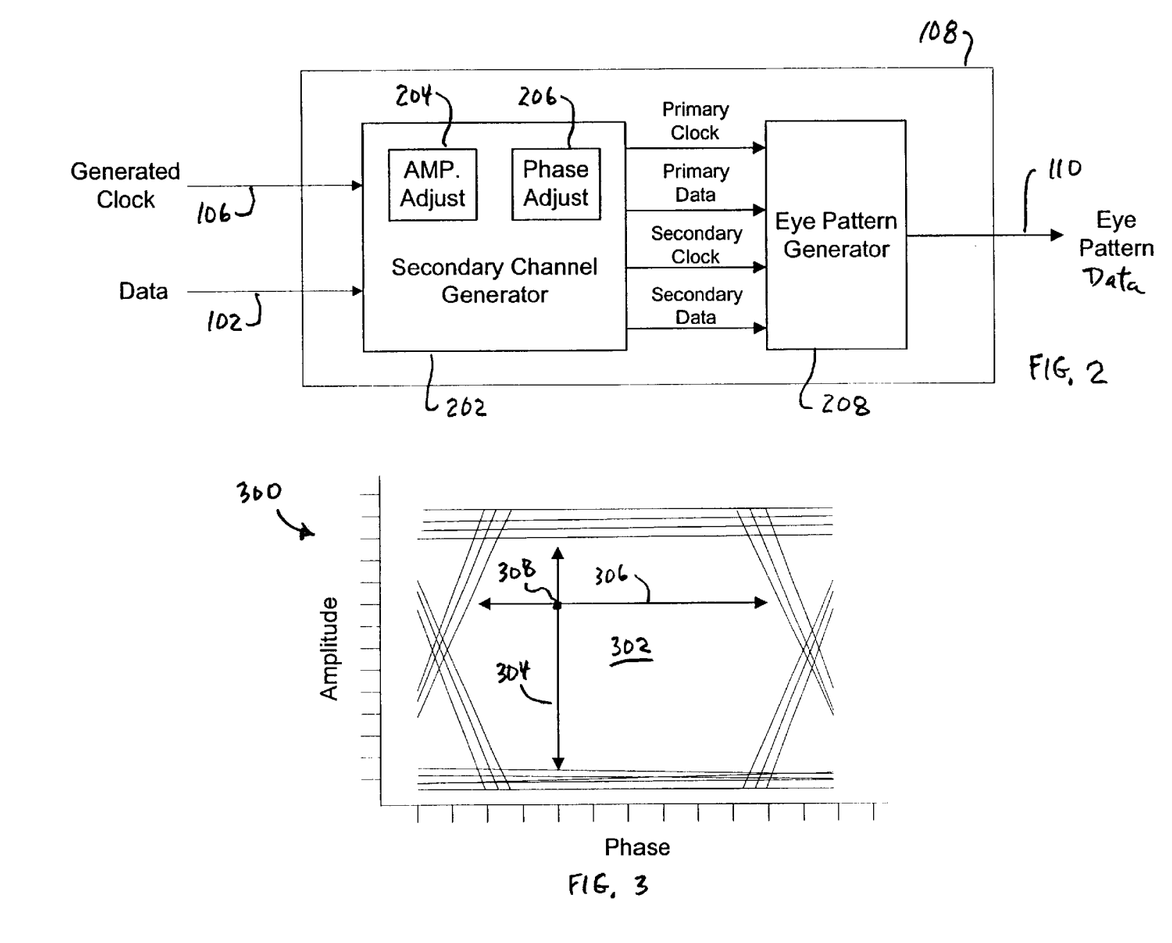
FIG. 2 shows a block diagram of typical eye pattern logic that generates eye patterns for use in one or more embodiments of the present invention.
FIG. 3 shows a typical eye pattern that may be generated from the eye pattern logic of FIG. 2.

FIG. 2 shows a block diagram of typical eye pattern logic, for example, eye pattern logic 108, that operates to generate eye patterns for use in one or more embodiments of the present invention. Typically, an eye pattern is produced to show amplitude and phase distortion of a data signal transmitted on a communication channel or through a particular communication component. The eye pattern may be produced by using an oscilloscope to display the received data stream while triggering the oscilloscope with the original data stream.

Another technique for generating an eye pattern is shown in FIG. 2. The data 102 and generated clock 106 recovered from the incoming data stream are input to a secondary channel generator 202. The secondary channel generator includes logic to adjust the amplitude 204 and the phase 206 of the data stream. The outputs of the secondary channel generator 202 are input to an eye pattern generator 208. The secondary channel generator outputs primary and secondary clock and data signals that are derived from the received clock and data signals. The eye pattern generator 208 may comprise any suitable hardware and/or software that operate to generate the eye pattern data 110.

The eye pattern generator generates the eye pattern data by sampling one of its input streams based on the other input stream. For example, one of the channels (primary or secondary) can be scanned in both amplitude and phase with respect to the other channel. At some point the channels will substantially agree with each other, however, as one channel is scanned in phase and/or amplitude, it will start to move away from the point of exact agreement until it reaches a point where its data substantially disagrees with the other channel's data. The resulting data can be used to form the eye pattern data 110 that, when displayed, includes an eye center that illustrates where the optimum detection region lies. The eye pattern generator may generate the eye pattern data by averaging the input data stream over a selected time period, so that the eye pattern data is produced from many cycles of the input data stream.

FIG. 3 shows a representative eye pattern 300 that may be generated from the eye pattern data 110 produced by the eye pattern logic 108. The eye pattern 300 includes an eye center 302 that indicates a region where the data stream may be accurately detected. The eye center 302 includes an amplitude height 304 that indicates an amplitude detection region, and a phase width 306 that indicates a phase detection region. In one embodiment of the invention, an optimal phase and amplitude detection point in the eye pattern is determined, for example, the point shown at 308.

The eye data includes a matching characteristic for each point represented by a phase and amplitude shift value. For example, as the eye pattern generator shifts one of its input channels with respect to the other input channel, the matching characteristic for each point indicates how well the data matches between the two channels at that point. Thus, the resulting eye pattern data is three-dimensional in that each phase and amplitude point has an associated matching characteristic. For example, for a selected amount of phase shift, one data point may have a matching characteristic that indicates that the two channels match 90% of the time and do not match 10% of the time. For the same phase shift, another data point might indicate that the two channels match virtually 100% of the time. Therefore, the eye pattern data comprises a wide-ranging matching characteristic for each phase and amplitude point that can be compared to a selected threshold to determine whether that point represents an open or closed condition of the eye. The threshold point can be set to any desired value in accordance with the present invention.

Figure 4:
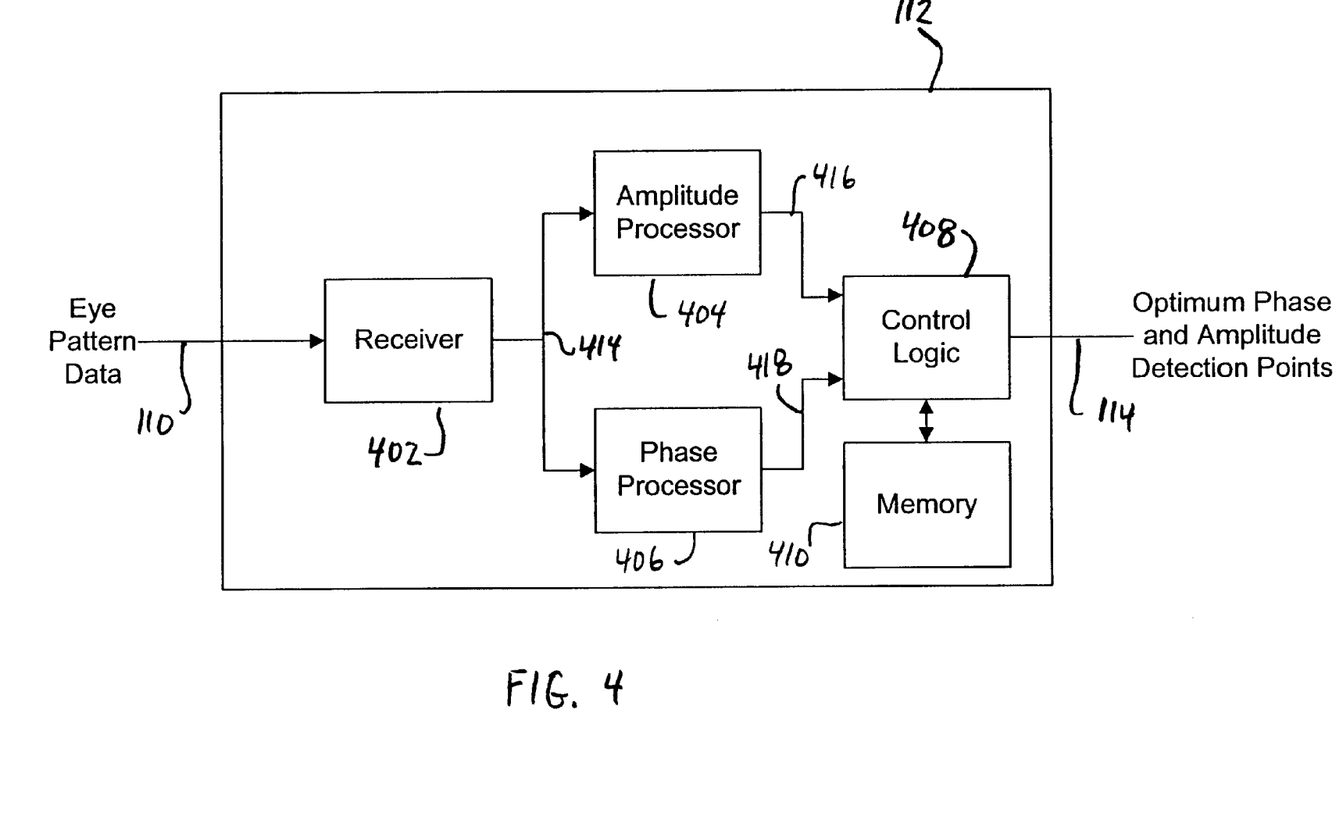
FIG. 4 shows a block diagram one embodiment of an eye pattern processor constructed in accordance with the present invention.

FIG. 4 shows a block diagram one embodiment of eye pattern processor 112 constructed in accordance with the present invention. The eye pattern processor 112 includes a receiver 402, an amplitude processor 404, a phase processor 406, control logic 408 and a memory 410. The receiver 402 operates to receive the eye pattern data 110, for example, the eye pattern data generated by the eye pattern logic 108, and produce received eye data 414 that is input to the amplitude processor 404 and the phase processor 406.

The amplitude processor 404 comprises any suitable hardware and/or software that may include a CPU, microcontroller, gate array, memory, or any other hardware logic and/or associated software to process the received eye data 414. The processor 404 processes the received eye data 414 to determine a maximum amplitude opening 416 in accordance with the present invention.

The phase processor 406 comprises any suitable hardware and/or software that may include a CPU, microcontroller, gate array, memory, or any other hardware logic and/or associated software to process the received eye data 414. The processor 406 processes the received eye data 414 to determine a maximum phase opening 418 in accordance with the present invention.

The control logic 408 comprises any suitable hardware and/or software that may include a CPU, microcontroller, gate array, or any other hardware logic and/or associated software to process the amplitude opening 416 and the phase opening 418. For example, the control logic operates to receive the amplitude opening 416, which is used to determine an amplitude detection point, and to adjust the amplitude detection point by a selected amount to compensate for anticipated system noise. For example, the amplitude detection point may first be determined to be at the center of the amplitude opening value, and after adjustment, may be at a level approximately 65% below its current level to account for system noise. For example, the system noise may be greater at higher amplitude detection levels than at lower amplitude detection levels, and so the amplitude detection point is adjusted downward to compensate for the different noise levels. In one embodiment of the invention, the amplitude detection point is adjusted more or less than 65% depending on the expected noise levels or other factors that may justify such an adjustment. A similar adjustment may be made to the phase detection point that is determined from the phase opening values.

Once the control logic completes any adjustments to the phase and/or amplitude opening values, if necessary, the control logic determines the optimal detection point for the data stream. The optimal detection point is defined by the intersection of the adjusted amplitude and phase openings. If no adjustments are made, then the optimal detection point is defined by the intersection of the maximum amplitude and phase opening values. The memory allows the detection values to be stored so that they may be used to compare successive detection point determinations to track the range of optimal detection values over time. Furthermore, the control logic outputs the optimum phase and amplitude detection points 114.

Figure 5:
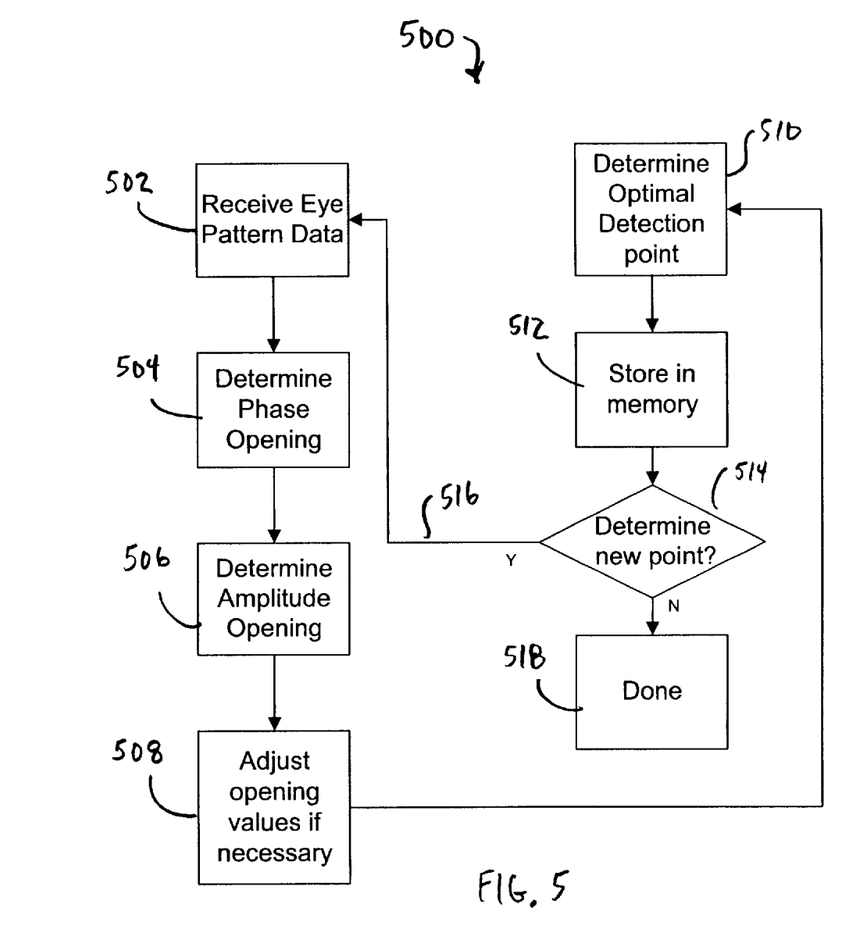
FIG. 5 shows one embodiment of a method for fine-tuning a detection point of a data stream in accordance with the present invention.

FIG. 5 shows one embodiment of a method 500 for fine-tuning a detection point of a data stream in accordance with the present invention. At block 502, eye pattern data representative of an incoming data stream is received. For example, any suitable hardware, such as eye pattern logic 108, can be used to generate the eye pattern data associated with a received data stream.

At block 504, a determination of a phase opening of the eye pattern data is performed, and at block 506, a determination of an amplitude opening is performed. A more detailed description of the determination of the amplitude and phase openings is provided in another section of this document.

At block 508, the phase and/or amplitude opening values are adjusted to accommodate special considerations, such as system noise parameters, to determine an optimal detection point. For example, the amplitude opening may be adjusted to accommodate system noise levels at the extremes of the amplitude detection range. However, adjustment is not necessary so that the determined phase and amplitude opening values are used in the following step.

At block 510, the adjusted phase and amplitude openings determined in the previous steps are used to determine an optimal detection point for the data stream. For example, the intersection of the adjusted phase and amplitude opening values are used to determine the optimum detection point. At block 512, the optimum detection point is stored in a memory as a means to save the determined result, and for comparing successive detection point determinations.

At block 514, a test is performed to determine if another optimum detection point should be determined. For example, successive optimum detection points can be compared to determine a stability characteristic of the data stream. If a new detection point is to be calculated, the method proceeds to block 502. If there is no need to calculate another optimum detection point, then the method proceeds to block 518, where the method to fine-tune the detection point is complete, and the optimum detection point is used to process the received data stream.

Figure 6:
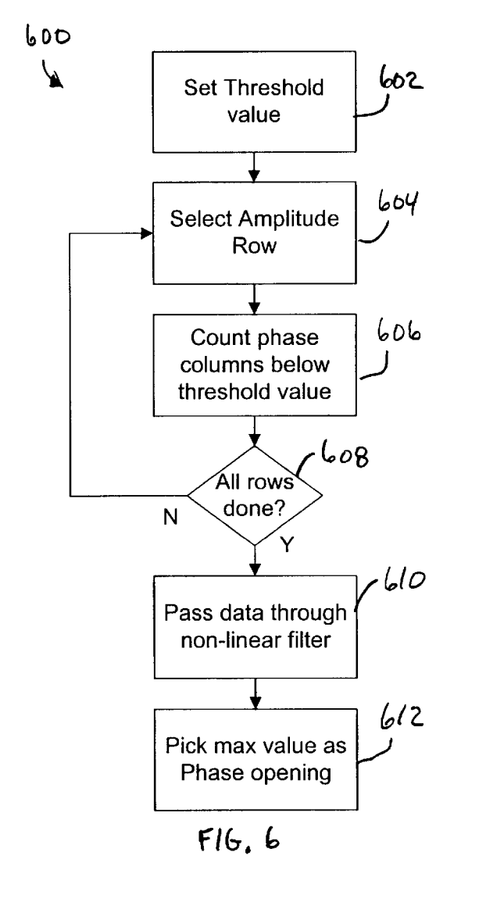
FIG. 6 shows one embodiment of a method for performing amplitude detection for use with the method of FIG. 5.

FIG. 6 shows one embodiment of a method 600 for determining a maximum phase opening for use with the method of FIG. 5 at block 504. At block 602, a threshold is set that represents a level used to determine whether the eye pattern is considered to be open or closed at any particular amplitude and phase point. This threshold is discussed above with reference to FIG. 3. For example, in a system where the threshold is set to 10%, a particular phase/amplitude point is considered to represent open eye data if the input channels used to create the eye data match 90% of the time at that point. Thus, the eye data may actually comprise a range of match levels that can be represented on a display using selected gray scale levels. In such a display, open eye data may be represented by the color white, while other ranges of eye data may be represented by various gray scale levels, until the color black is used for eye data that is considered to represent a closed eye. Any selected match percentage may be used to determine the range of values that represent open and closed eye data.

At block 604, an amplitude row is selected from the eye pattern data so that an amplitude count for that row can be determined. For example, the eye pattern data is divided by a grid representing amplitude rows and phase columns. For example, the eye pattern data generated by the eye pattern logic 108 is the result of shifting the primary and secondary data channels with respect to each other. The shifting of the amplitude and phase are indicated by the amplitude and phase grid divisions in the eye pattern, as shown in FIG. 3. For example, the eye pattern may be formed from 64 amplitude rows and 64 phase columns.

At block 606, an amplitude count is determined for the selected amplitude row. Each amplitude row cuts across all the phase columns. Thus, the amplitude count value for each amplitude row is the number of phase columns in that row having a data value that is less than the selected threshold value.

At block 608, a test is performed to determine if an amplitude count has been determined for all amplitude rows. If not, the method proceeds to block 604 where a new amplitude row is selected for counting. If an amplitude count has been determined for all the amplitude rows, then the method proceeds to block 610. In another embodiment included in the present invention, the above steps can be performed more quickly by selecting only a portion of the amplitude rows for which a count value will be determined. Thus, count values may not be determined for those amplitude rows at the extremes of the amplitude range where the desired phase opening is unlikely to be found.

At block 610, the resulting amplitude count data is passed through a non-linear digital filter. The non-linear filter is used to remove count anomalies, for example, very large or very small amplitude count values. For example, using simple filtering, high or low count values would still tend to skew the count data. Thus, a non-linear filter is used to avoid the skewing effects of the anomalies. A more detailed description of the nonlinear filtering function is provided in another section of this document. At block 612, the maximum phase opening is determined from the filtered amplitude count values. For example, once the non-linear filter removes the count anomalies, the amplitude row with the highest count value is determined to be the maximum phase opening in the eye pattern data. In a situation where multiple rows have the same maximum count value, then the median amplitude row column is selected to be the maximum phase opening.

Figure 7:
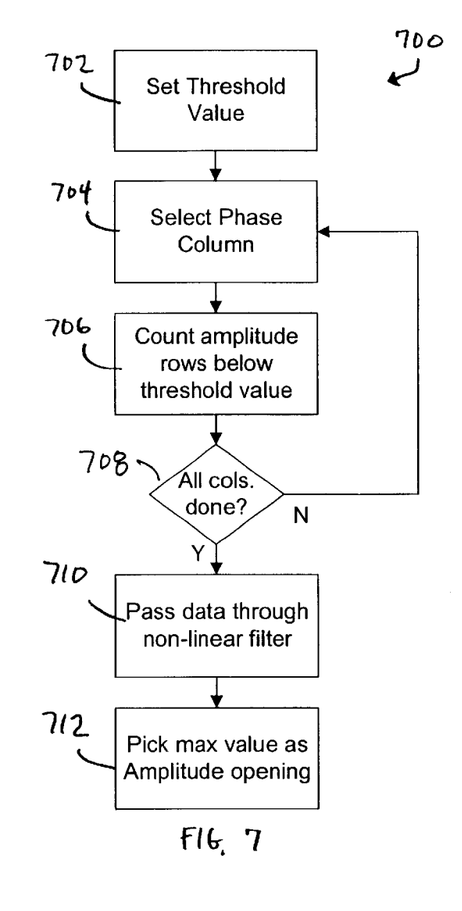
FIG. 7 shows one embodiment of a method for performing phase detection for use with the method of FIG. 5.

FIG. 7 shows one embodiment of a method 700 for determining a maximum amplitude opening for use with the method of FIG. 5 at block 506. At block 702, a threshold is selected that represents the boundary between a data value of "0" and a data value of "1." For example, in a system where the amplitude of the data may be in a range of zero to five volts, the threshold may be selected to be 0.5 volts, below which the data is determined to be a zero.

At block 704, a phase column is selected so that a phase count for that column can be determined. For example, the eye pattern data is divided by a grid representing amplitude rows and phase columns as described above.

At block 706, a phase count is determined for the selected phase column. Each phase column cuts across all the amplitude rows. Thus, the phase count value for each phase column is the number of amplitude rows in that phase column having a data entry that is less than the selected threshold value.

At block 708, a test is performed to determine if a phase count has been determined for all phase columns. If not, the method proceeds to block 704 where a new phase column is selected for counting. If a phase count has been determined for all the phase columns, then the method proceeds to block 710. In one embodiment included in the present invention, only of portion of the phase columns are selected for counting, for example, those not close to the phase extremes, to speed up operation of the above steps.

At block 710, the resulting phase count data is passed through a non-linear digital filter. The non-linear filter is used to remove count anomalies, for example, very large or very small phase count values. For example, using simple filtering, high or low count values would still tend to skew the phase count data. Thus, a non-linear filter is used to avoid the skewing effects of the anomalies. A more detailed description of the non-linear filtering function is provided in another section of this document.

At block 712, the maximum amplitude opening is determined from the filtered phase count values. For example, once the non-linear filter removes the count anomalies, the phase column with the highest count value is determined to be the maximum amplitude opening in the eye pattern data.

In a situation where multiple columns have the same maximum count value, then the median phase column is selected to be the maximum amplitude opening.

Figure 8:
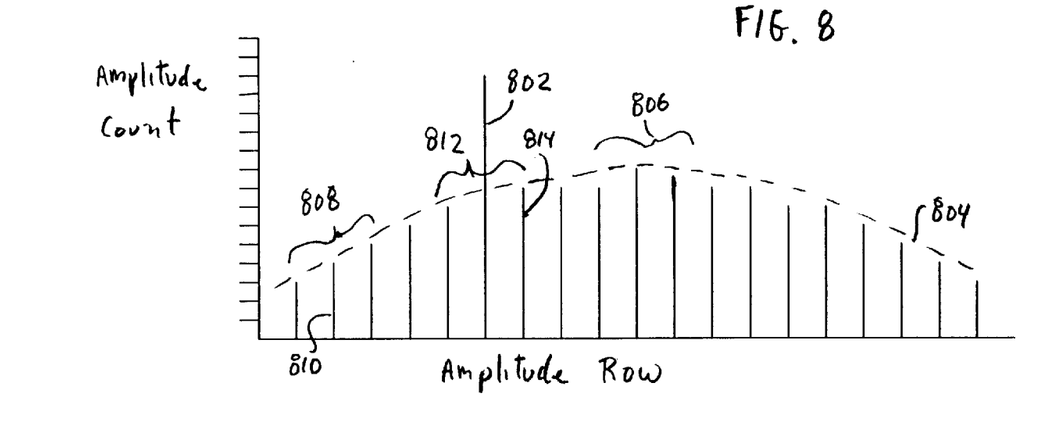
FIG. 8 shows a graph of exemplary amplitude data determined in the method of FIG. 6.

FIG. 8 shows a graph of exemplary amplitude count data determined in the method 600 of FIG. 6. As the amplitude row values increase, the count values increase until a point is reached where the count values begin to decrease. Thus, the largest phase opening best occurs in a region of the eye pattern where the amplitude rows have the highest count values, for example, the region identified at 806.

Also shown in the graph of FIG. 8 is a count anomaly peak 802. For this particular amplitude row, the count value was extremely high, i.e., much higher than the count value for its neighbor rows. Such an anomaly may skew the determination of the maximum phase opening, since an envelope 804 of the count data shows that the true count maximum is in the region 806. To overcome the anomaly, a non-linear filtering process is used.

If a simple averaging process is used to overcome the anomaly, the peak 802 may be smoothed out somewhat, however, it would most likely still represent the largest count value, and so would be improperly selected to represent the maximum phase opening. However, the data indicates that the maximum count should be determined from the region 806. Another way to filter the data would be to use a moving average filter. Unfortunately, some moving average filters would place the same weight on peak 802 as on the rest of the count data, and so the peak 802 would still be dominate. On the other hand, a non-linear digital filter can be used to eliminate the effects of the anomaly.

The non-linear filter can be implemented by selecting groups of three rows, sorting the count data for the three rows in ascending value, and picking the middle value to be the count value for the middle row. This type of filtering effectively eliminates maximums and minimums in the count data. For example, group 808 shows the count values for three rows. By sorting the count values into ascending order and picking the middle value, the count value shown at 810 would be selected. Group 812 shows the count values for three rows that include the peak 802. By sorting those count values into ascending order and picking the middle value, the count value shown at 814 would be selected. Thus, the peak 802 is deselected and prevented from skewing the count data.

The described embodiments provide for the use of a non-linear digital filter to overcome the drawbacks of using simple filters or moving average filters. However, the use of any suitable filter to prevent data skew due to anomalies is within the scope of the present invention. For example, other types of moving average filters having different weighting values may be used. Thus, the embodiments of the invention are not limited to the use of only non-linear digital filters, so that any suitable filter may be use to prevent one or more count anomalies from skewing the count data.

Figure 9:
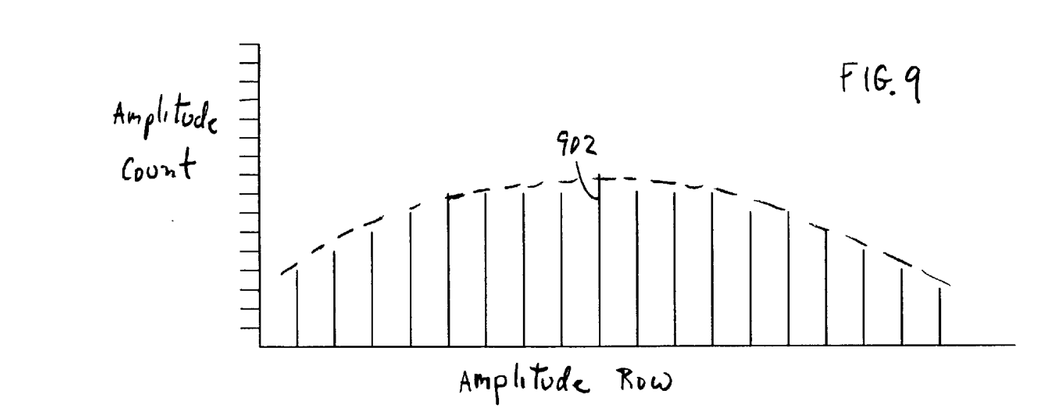
FIG. 9 shows a graph of the amplitude data of FIG. 8 after the application of a non-linear filter in accordance with the present invention.

FIG. 9 shows a graph of the amplitude count data of FIG. 8 after the application of a non-linear filter in accordance with the present invention. It is clearly shown in the graph of FIG. 9 that the peak 802 has been eliminated as the result of the non-linear filtering process. The maximum count value is now determined to be at 902, which represents the amplitude row having the largest phase opening. The same process as described for filtering the amplitude count values can be used to filter the phase count values, as required at block 710.

Figure 10:
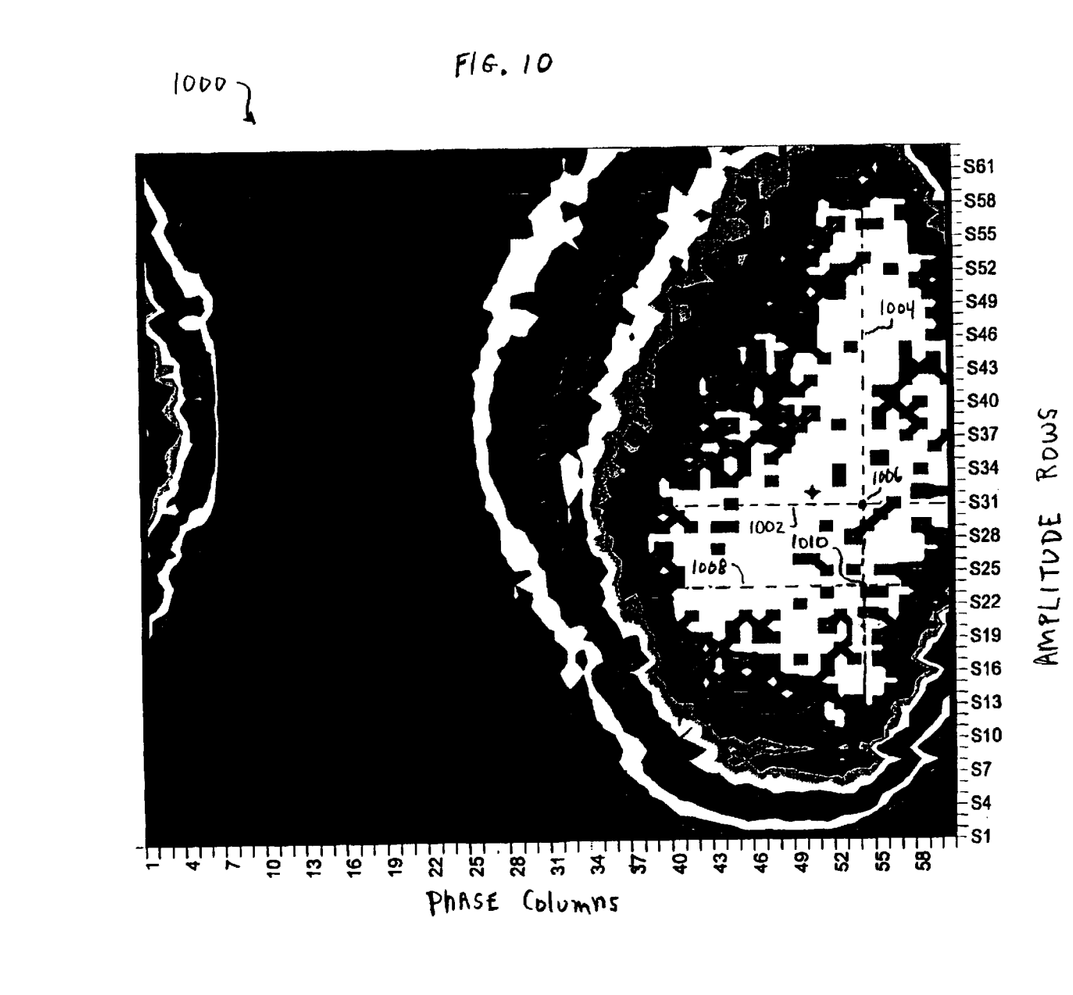
FIG. 10 shows an exemplary eye pattern processed in accordance with the present invention that indicates optimal phase and amplitude detection level.

FIG. 10 shows an exemplary eye pattern 1000 processed in accordance with the present invention that indicates an optimal phase and amplitude threshold detection point. The eye pattern 1000 indicates phase shift values on the horizontal axis and amplitude shift values on the vertical axis. For example, the eye pattern logic 108 generates an eye pattern by creating a secondary channel and shifting the secondary channel in both phase and amplitude to form an eye pattern. That eye pattern is processed by the system 400 to produce a detected eye pattern, which results after the eye pattern data is compared to a selected threshold value as provided by the method 500. Therefore, the eye pattern 1000 results, where white areas indicate regions of the eye pattern considered to be open (below threshold), and dark areas indicate regions of the eye pattern considered to be closed (above threshold).

Once the detected eye pattern is generated, the maximum phase and amplitude openings can be determined from the methods 600 and 700, respectively. For example, as shown in the detected eye pattern 1000, the maximum phase opening is shown at 1002 and the maximum amplitude opening is shown at 1004. Thus, in one embodiment of the invention, the optimum detection point to detect the data is determined by the intersection of the maximum amplitude and phase openings. This optimal detection point is shown at 1006.

In one embodiment of the present invention, adjustments can be made to the maximum amplitude and/or phase openings to determine adjusted maximum openings that are used to determine the optimal detection point. For example, the control logic 408 operates in accordance with the method 500 at block 510 to adjust the maximum opening values. For example, the maximum amplitude opening can be adjusted by 65% as provided by the following expression to determine an adjusted amplitude opening (y).

$$y = x[1-((MO/64)*(1-0.65))]$$

To evaluate the above expression it will be assumed that the eye pattern data forms a grid of 64 amplitude rows by 64 phase columns. Thus, "x" represents the amplitude row having the largest phase opening, and MO is the maximum opening count value for the largest amplitude opening. For example, if x=31 and MO=45, the adjusted amplitude opening can be found by evaluating the following expressions.

$$y = 31[1-((45/64)*(1-0.65))]$$

$$y = 31[1-(0.7*0.35)].$$

$$y = 31[0.75] = 23.25$$

The adjusted amplitude opening value (y=23.25) is shown in FIG. 10 at 1008, and intersects with the phase opening value 1004 to determine the optimal detection point, as shown at 1010.

Figure 11:
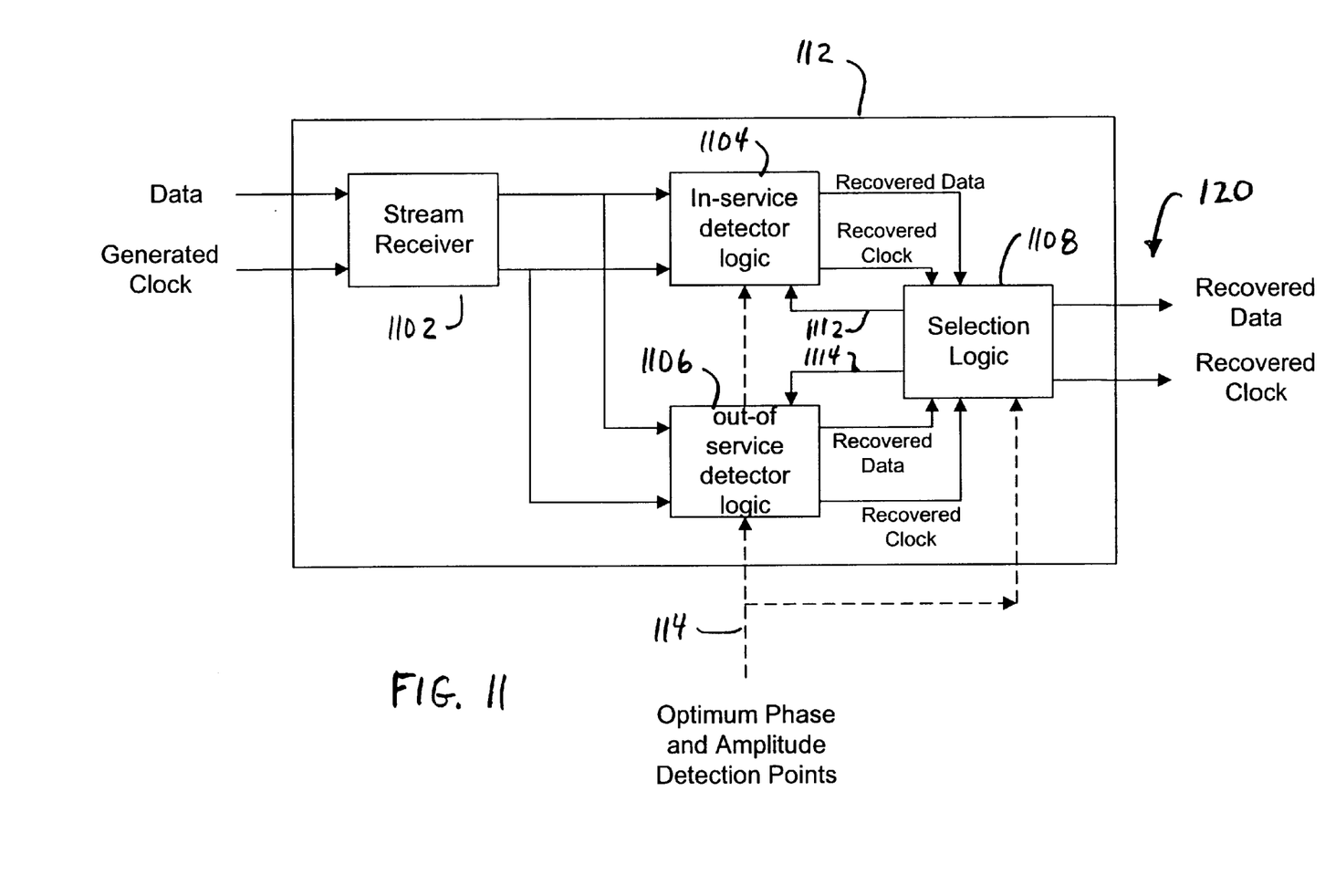
FIG. 11 shows one embodiment of decision logic that provides for the generation of in-service and out-of-service recovered data and clock in accordance with the present invention.

FIG. 11 shows one embodiment of the decision logic 116 that provides for the generation of in-service and out-of service detected data streams in accordance with the present invention. The decision logic 116 includes a stream receiver 1102, in-service detector logic 1104, out-of-service detector logic 1106, and selection logic 1108. The components shown as part of the decision logic 116 may be comprised of any suitable hardware and/or software that may include a CPU, microcontroller, gate array, memory, or any other hardware logic and/or associated software to process a received data stream in accordance with the present invention.

The stream receiver 1102 receives the incoming data stream and generated clock signals and provides identical versions of the received streams to the in-service 1104 and out-of-service 1106 detectors. The in-service and out-of-service detectors receive as input the optimum phase and amplitude detection points 114 as determined in accordance with the present invention. The in-service 1104 and out-of-service 1106 detectors operate to utilize the received optimum detection points to produced adjusted data and clock information to the selection logic 1108.

The selection logic 1108 also receives the optimum phase and amplitude detection points 114. The selection logic 1108 includes control outputs 1112 and 1114 that are coupled to the in-service 1104 and out-of-service 1106 detectors, respectively. The control outputs 1112, 1114 operate to command the detectors to update their respective outputs based on new optimum phase and amplitude detection points. For example, if one of the detectors is currently outputting adjusted data and clock based on a previously receive detection points, the control output coupled to that detector operates to command that detector to used a new detection point that may have become available. Thus, either detector can be commanded to use the newest phase and amplitude detection points as they become available.

The selection logic 1108 operates to receive the recovered clock and data from the detectors and to output the recovered clock and data from either detector at the output as shown at 120. Thus, the selection logic can control which one of the detectors will provide in-service and out-of-service recovered data and clock.

In one embodiment included in the present invention, a method is provided for selecting one the detectors to be the in-service detector to provide the recovered data and clock at the output 120. At the beginning of the method, both detectors receive the newest phase and amplitude detection points and those values are used to produce recovered clock and data to the selection logic 1108. The selection logic selects one of the recovered signal sets to output at 120 to downstream processing systems.

As new phase and amplitude detection points are determined from successive eye pattern detections of the incoming data stream in accordance with the present invention, the selection logic uses its control outputs (1112, 1114) to control how the detectors update their recovered clock and data outputs. The selection logic 1108 also receives the updated phase and amplitude detection points 1110. The selection logic operates to determine when the newly received phase and amplitude detection points should be used to produce the recovered clock and data. When this determination is made, the selection logic performs a switch, so that the signals received from the current out-of-service detector are provided at the output 120.

Once the selection logic performs the switching function, the new in-service detector maintains it current detection point and the new out-of-service detector is commanded to update its detection point with any newly received detection point. In effect, the detectors have changed roles so that the out-of-service detector effectively becomes the in-service detector, and vice versa.

The above process continues so that the selection logic may switch between the two detectors at selected times so that the most up to date phase and amplitude detection points are used to produce the recovered signals output at 120. The selection logic can determine when to switch between the detectors based on a number of factors. For example, in one embodiment the selection logic determines when the phase and amplitude detector points have changed by a selected amount, for instance, by 10 percent. Thus, if either the phase or amplitude detection level changes by this amount, the selection logic will cause a switch between the detectors to occur so that the new detection point will be used to generate the signals at the output 120.

In another embodiment, the selection logic causes a switch between the detectors to occur at regular intervals. For example, the switch may be triggered for specific time increments, for instance, every 500 milliseconds a detector switch is performed. In another embodiment, the switch is performed based on a number of new detection point determinations. For example, every third new detection point determination causes a detector switch to occur, so that the most recent detection point is used to form the data at the output 120. Thus, it will be understood by those with skill in the art that many different criteria can be specified to determine when a detector switch should be performed, and such various criteria are well within the scope of the present invention.

Figure 12:
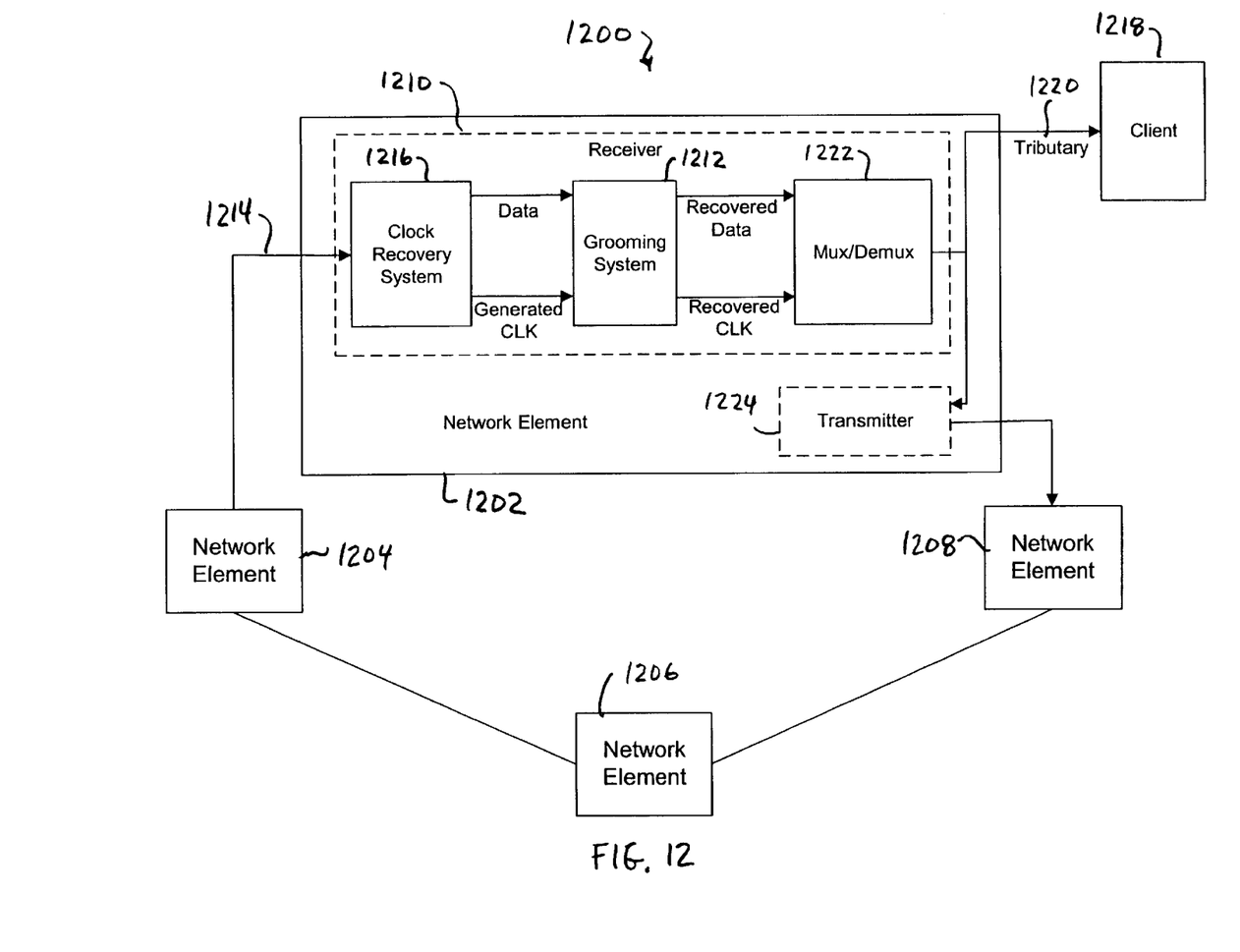
FIG. 12 shows an exemplary optical ring network that includes a grooming system in accordance with the present invention.

FIG. 12 shows an exemplary optical ring network 1200 that includes a grooming system in accordance with the present invention. The network 1200 includes network elements 1202, 1204, 1206, and 1208. The element 1202 includes a receiver 1210 that comprises a grooming system 1212 constructed in accordance with the present invention.

The receiver 1210 receives a line signal 1214 that is input to a clock recovery system 1216. The clock recovery system provides a data and generated clock signal to the grooming system 1212. The grooming system 1212 operates to provide optimum detection of the data in accordance with the present invention. Recovered data and clock output from the grooming system 1212 are input to a multiplexer/demultiplexer (mux/demux) 1222 where selected data is recovered and output to a client 1218 via an output tributary 1220. Thus, the grooming system operates to provide optimum detection of received data so that the client 1218 may receive the highest quality data possible. The network element 1202 also includes a transmitter 1224 that operates to receive the recovered data stream and output the stream via the network to the network element 1208. Thus, the grooming system operates to optimally recover the received stream for transmission over the network to another network element.

The present invention includes a system to fine-tune the detection point of an incoming data stream. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A system for determining an optimal detection point associated with a data stream, wherein the data stream has an associated eye pattern that contains a data value for each of a plurality of detection points defined by a plurality of amplitude rows and a plurality of phase columns, the system comprising:

an amplitude processor operable to determine an amplitude opening value for each of the phase columns, wherein for each of the phase columns the amplitude opening value indicates a total number of the plurality of amplitude rows that contain a data value that is below a selected threshold value, and wherein the amplitude processor operates to determine a selected phase column based on the amplitude opening values;

a phase processor operable to determine a phase opening value for each of the amplitude rows, wherein for each of the amplitude rows the phase opening value indicates a total number of the plurality of phase columns that contain a data value that is below the selected threshold value, and wherein the phase processor operates to determine a selected amplitude row based on the phase opening values;

control logic coupled to the amplitude processor and the phase processor, the control logic is operable to determine the optimal detection point based on the selected phase column and the selected amplitude row.

2. The system of claim 1, further comprising a memory coupled to the control logic, the memory is operable to store the phase opening values and the amplitude opening values.

3. The system of claim 1, wherein the control logic operates to adjust the selected amplitude row to counteract the effects of system noise to produce an adjusted amplitude row that is used to determine the optimal detection point.

4. The system of claim 1, wherein the amplitude detector includes an amplitude filter to filter the amplitude opening values.

5. The system of claim 4, wherein the amplitude filter is a non-linear digital filter.

6. The system of claim 1, wherein the phase detector includes a phase filter to filter the phase opening values.

7. The system claim 1, further comprising decision logic coupled to receive the optimal detection point, wherein the decision logic operates to use the optimal detection point to produce a recovered data stream that is output to a downstream processing system.

8. The system of claim 7, wherein the decision logic comprises in-service and out-of-service transmitters coupled to receive the data stream and the optimal detection point to produce an in-service recovered data stream and an out-of-service recovered data stream.

9. The system of claim 8, wherein the decision logic further comprises selection logic coupled to the in-service and out-of-service transmitters, wherein the selection logic operates to select one of the in-service recovered data stream and an out-of-service recovered data stream to output to the downstream processing system.

10. The system of claim 9, wherein the selection logic selects one of the recovered data streams based on receiving a selected number of detection point updates.

11. A method for optimizing a detection point associated with a data stream, wherein the data stream has an associated eye pattern that contains a data value for each of a plurality of threshold points defined by a plurality of amplitude rows and a plurality of phase columns, the method comprising steps of:

determining an amplitude opening value for each of the phase columns, wherein for each of the phase columns the amplitude opening value indicates a total number of the amplitude rows that contain a data value that is below a selected threshold value;

determining a phase opening value for each of the amplitude rows, wherein for each of the amplitude rows the phase opening value indicates a total number of the plurality of phase columns that contain a data value that is below the selected threshold value;

determining a selected amplitude row from the phase opening values and a selected phase column from the amplitude opening values; and determining the optimal detection point from the selected phase column and the selected amplitude row.

12. The method of claim 11, wherein the step of determining the selected phase column comprises steps of:

filtering the amplitude opening values to produce filtered amplitude opening values; and selecting the phase column having the largest filtered amplitude opening value to be the selected phase column.

13. The method of claim 11, wherein the step of determining the selected amplitude row comprises steps of:

filtering the phase opening values to produce filtered phase opening values; and selecting the amplitude row having the largest filtered phase opening value to be the selected amplitude row.

14. The method of claim 12, wherein the step of filtering is a step of filtering the amplitude opening values with a non-linear digital filter to produce the filtered amplitude opening values.

15. The method of claim 13, wherein the step of filtering is a step of filtering the phase opening values with a non-linear digital filter to produce the filtered phase opening values.

16. The method of claim 11, further comprising steps of:

determining the selected amplitude row to be the amplitude row having the largest phase opening value; and determining the selected phase column to be the phase column having the largest amplitude opening value.

17. The method of claim 16, further comprising a step of adjusting the largest amplitude opening value by sixty-five percent.

18. The method of claim 11, further comprising a step of transmitting the optimal detection point to decision logic, wherein the decision logic operates to use the optimal detection point to produce a recovered data stream that is output to a downstream processing system.

19. The method of claim 18, further comprising steps of:

receiving the data stream and the optimal detection point at the decision logic; and producing an in-service recovered data stream and an out-of-service recovered data stream.

20. The method of claim 19, further comprising a step of select one of the in service recovered data stream and an out-of-service recovered data stream to output to the downstream processing system.

21. The method of claim 20, further comprising a step of selecting one of the in-service recovered data stream and an out-of-service recovered data stream to output to the downstream processing system based on receiving a selected number of detection point updates.

22. A grooming system for use in an optical network that comprises a plurality of network elements interconnected to form a communication network, wherein the grooming system is used at a selected network element to optimally detect a data stream received from the network for transmission to a network client via a tributary output, the grooming system comprising:

eye pattern generator logic that operates to receive the data stream and generate an associated eye pattern that contains a data value for each of a plurality of detection points defined by a plurality of amplitude rows and a plurality of phase columns;

an amplitude processor operable to determine an amplitude opening value for each of the phase columns, wherein for each of the phase columns the amplitude opening value indicates a total number of the plurality of amplitude rows that contain a data value that is below a selected threshold value, and wherein the amplitude processor operates to determine a selected phase column based on the amplitude opening values;

a phase processor operable to determine a phase opening value for each of the amplitude rows, wherein for each of the amplitude rows the phase opening value indicates a total number of the plurality of phase columns that contain a data value that is below the selected threshold value, and wherein the phase processor operates to determine a selected amplitude row based on the phase opening values;

control logic coupled to the amplitude processor and the phase processor, the control logic is operable to determine the optimal detection point based on the selected phase column and the selected amplitude row.

23. The system claim 22, further comprising decision logic coupled to receive the optimal detection point, wherein the decision logic operates to use the optimal detection point to produce a recovered data stream that is output to a client system.

24. The system claim 22, further comprising decision logic coupled to receive the optimal detection point, wherein the decision logic operates to use the optimal detection point to produce a recovered data stream that is retransmitted over the optical network.

* * * * *